United States Patent
Djordjevic

(10) Patent No.: US 6,840,229 B1
(45) Date of Patent: Jan. 11, 2005

(54) MAGNETICALLY COUPLED FUEL INJECTOR PUMP

(75) Inventor: Ilija Djordjevic, East Granby, CT (US)

(73) Assignee: Stanadyne Corporation, Windsor, CT (US)

( * ) Notice: Subject to any disclaimer, the term of this patent is extended or adjusted under 35 U.S.C. 154(b) by 65 days.

(21) Appl. No.: 10/344,588
(22) PCT Filed: Aug. 13, 2001
(86) PCT No.: PCT/US01/25213
§ 371 (c)(1), (2), (4) Date: Feb. 13, 2003
(87) PCT Pub. No.: WO02/14678
PCT Pub. Date: Feb. 21, 2002

Related U.S. Application Data
(60) Provisional application No. 60/225,159, filed on Aug. 14, 2000.

(51) Int. Cl.$^7$ .............................................. F02M 37/04
(52) U.S. Cl. ...................................................... 123/497
(58) Field of Search ................................ 123/495, 497

(56) References Cited

U.S. PATENT DOCUMENTS
5,507,266 A * 4/1996 Wright et al. ................ 123/497

* cited by examiner

Primary Examiner—Thomas Moulis
(74) Attorney, Agent, or Firm—Alix, Yale & Ristas, LLP

(57) ABSTRACT

A pump (10) of high pressure direct injection fuel supply system is connected to the engine through a magnetic clutch which includes a motorizing function. The magnetic clutch comprises rotating electromagnetic coils (20) attached to and driven by the engine and rotating permanent magnets (34) attached to and driving the pump. The slippage of the clutch is controlled by the on-off cycle of electrical power which is simultaneously supplied to all of the electromagnetic coils and may be responsive to the pressure in the fuel injections rail. The clutch may be operated as an electrical motor by sequentially activating the electromagnetic coils for the purpose of providing fuel pressure even prior to rotation or cranking of the engine. An isolation barrier hermetically seals the fuel injection pump from the engine.

4 Claims, 5 Drawing Sheets

– 1 –

MAGNETICALLY COUPLED FUEL INJECTOR PUMP

This application claims the benefit of Provisional application Ser. No. 60/225,159, filed Aug. 14, 2000.

BACKGROUND OF THE INVENTION

A number of potential advantages have led the automotive industry to look with increasing interest toward utilizing common rail (manifold) high pressure direct injection for gasoline engines. A number of design constraints or difficulties seem to stand in the way of fully achieving the advantages.

The pressurization of fuel to high levels (e.g., above 100 bar) requires considerable pumping power, which generates considerable heat. Moreover, the industry is looking for even higher rail pressures, above 200 bar. This heat could be dissipated to a large extent, if all the fuel that is pressurized, can be quickly injected into the engine cylinders.

This is not possible, however, because the fuel pump flow rate is typically sized for engine cranking, which may be at 20–30 bar pressure at a high quantity discharge flow rate, whereas typical steady state cruising conditions require much lower quantity flow rates at 100 bar. Therefore, in a conventional pumping scheme, the volume of fuel raised to injection pressure during the course of an hour of typical vehicle use, is much greater than the volume of fuel actually injected during that same hour of use. Although pre-metering and various spill control techniques can be used to some advantage in this regard, none of these techniques satisfactorily regulates the power output of the high pressure pump itself.

Another difficulty is encountered with high pressure pumps that are driven directly by the engine (e.g., crank shaft, cam shaft, accessory belt). During transients when fuel demand is low (e.g., downhill or during gear shifting), the engine continues to turn and the, pump continues to deliver high pressure fuel to the common rail that may already be at maximum pressure.

SUMMARY OF THE INVENTION

It is an object of the present invention to provide a high pressure gasoline common rail direct injection fuel supply system, in which the high pressure discharge of the pump for raising and maintaining the rail pressure above 100 bar, is responsive to engine demand. The energy imparted to the discharged fuel (e.g., pressure increase) is over time, significantly reduced relative to conventional systems.

According to the invention, a high pressure rotary pump is coupled to the engine with a magnetic clutch which may also serve as a motorized drive. The speed of the pump can be controlled by the degree of slippage of the clutch, which is responsive to the rail pressure. The clutch can quickly increase the pump drive shaft speed by reducing slippage and thus provide high pumping volume during cranking, while reducing speed to a low level by slippage with associated low pumping volume when the vehicle is cruising. Similarly, the clutch can intermittently increase speed as needed to accommodate load demand during acceleration or, in essence, stop the pump drive when the vehicle is coasting. In a particularly noteworthy aspect, the clutch is arranged and controllable so that the clutch can include a "motorizing" feature, which can be used to increase the speed of the pump during cranking when the pump speed would otherwise be slower than desired. The invention also provides for the positive sealing of the pump by an isolation barrier.

DETAILED DESCRIPTION OF THE PREFERRED EMBODIMENT

Figure 1:
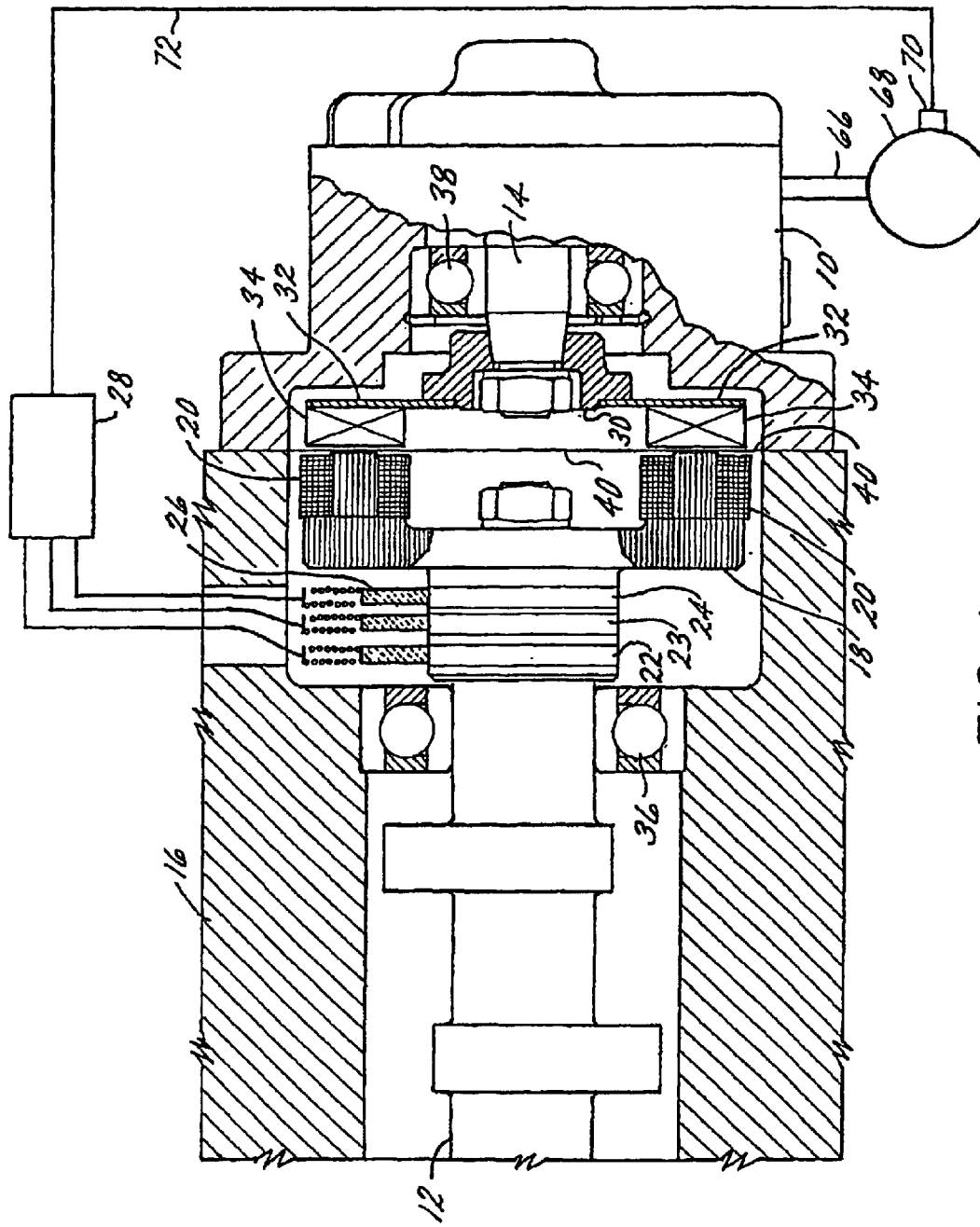
FIG. 1 is a view partially in cross section of a fuel pump driven by a magnetic clutch attached to a rotating shaft of an engine with the fuel pump discharging into a common fuel injection rail with the clutch controlling the rail pressure.

According to the invention, as first exemplified in FIG. 1, an engine mounted fuel injection pump generally designated 10 is driven by any rotating shaft of the engine, for example a camshaft, crank shaft, or engine accessory shaft. However, rather than being transferred directly, the power is transferred from the engine to the pump by a magnetic clutch. Magnetic clutches are used in various industries to control slippage between the input and output shaft at more or less constant torque. The magnetic clutch consists of two rotating members, a drum with magnetic coils mounted on the torque input shaft and a rotor with permanent magnets mounted on the torque output shaft. As shown in FIG. 1, the torque input shaft 12 is an engine camshaft, whereas the torque output shaft 14 is the pump shaft (usually an eccentric shaft) of a typical radially reciprocating, multi-plunger gasoline direct injection pump of known construction.

Figure 2:
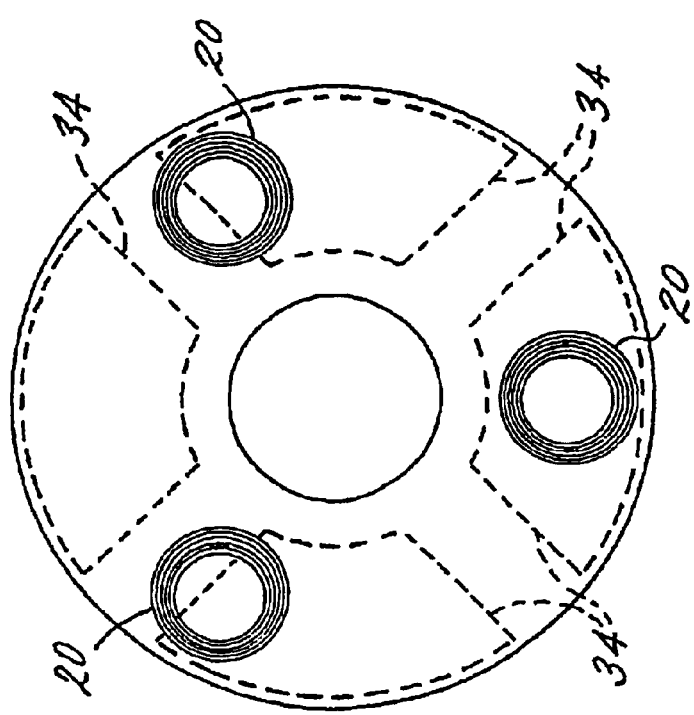
FIG. 2 diagrammatically illustrates a face view of the arrangement of coils and permanent magnets for the version of the invention shown in FIG. 1.

Again referring to FIG. 1, a portion 16 of an engine houses the camshaft 12. Mounted onto the end of the camshaft 12 is a drum 18 with a series of electromagnetic coils 20 each connected to the slip rings 22, 23 and 24. The slip rings are contacted by the brushes 26 which are connected into the controller 28 as will be discussed further below. During cranking, the coils 20 produce a rotating magnetic field which is used to drive the output shaft 14 of the pump 10. Rigidly mounted on the output shaft 14 is a rotor comprising the hub 30 and support disk 32 on which are mounted the permanent magnets 34. Torque is transmitted from the camshaft 12 by the magnetic coils 20 to the permanent magnets 34 and then to the output shaft 14. FIG. 2 is a diagram illustrating the relationship of the coils 20 and permanent magnets 34. Since the energy transmitting components (the magnetic coils and the permanent magnets) are substantially annular and face each other in the axial direction with an air gap separation, some axial forces are generated which are supported by drive shaft bearings 36 and pump bearings 38. However, this configuration permits the use of a relatively simple isolation barrier 40 between the input side comprising the camshaft 12, drum 18 and magnetic coils 20 and the output side comprising the pump and including the hub 30, support disk 32 and permanent magnets 34. With this arrangement, the isolation barrier 40 is a simple flat plate or diaphragm usually of stainless steel where all radial forces are balanced and mechanical axial forces are absent. There will, however, be an axial force component acting on the positive pressure barrier 40 originating from hydraulic pressure in the pump housing. This axial force needs to be considered in the dimensioning and design of the barrier 40 and especially its minimum thickness. The thickness of the barrier 40 affects the size of the air gap between the coils and magnets, and by that, also the efficiency of the clutch. In order to reduce the hydraulic pressure in the pump housing, it is possible to provide separate inlet and outlet check valves located in the hydraulic head and allow the hydraulic pressure in the housing to be reduced to a lower level. This would require a leak-off line which is not shown.

Figure 4:
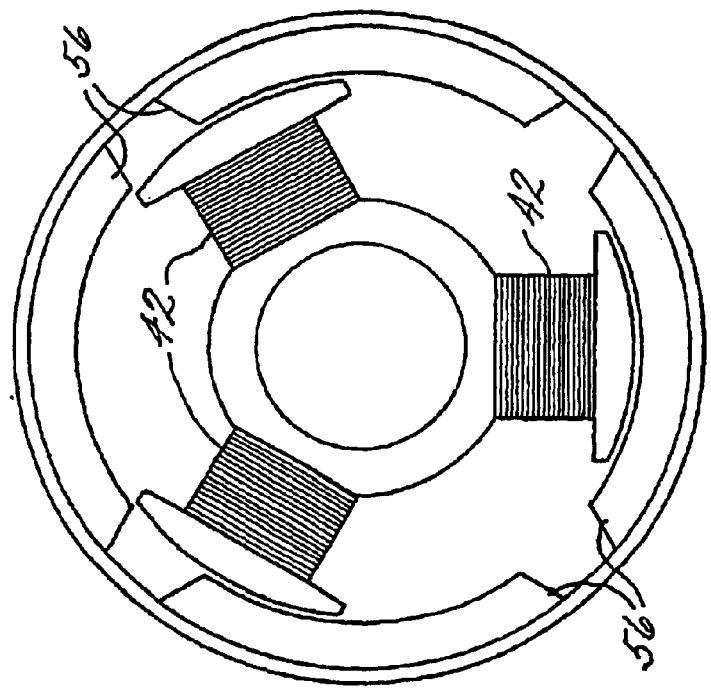
FIG. 4 diagrammatically illustrates a face view of the arrangement of coils and permanent magnets for the version of the invention shown in FIG. 3.
Figure 3:
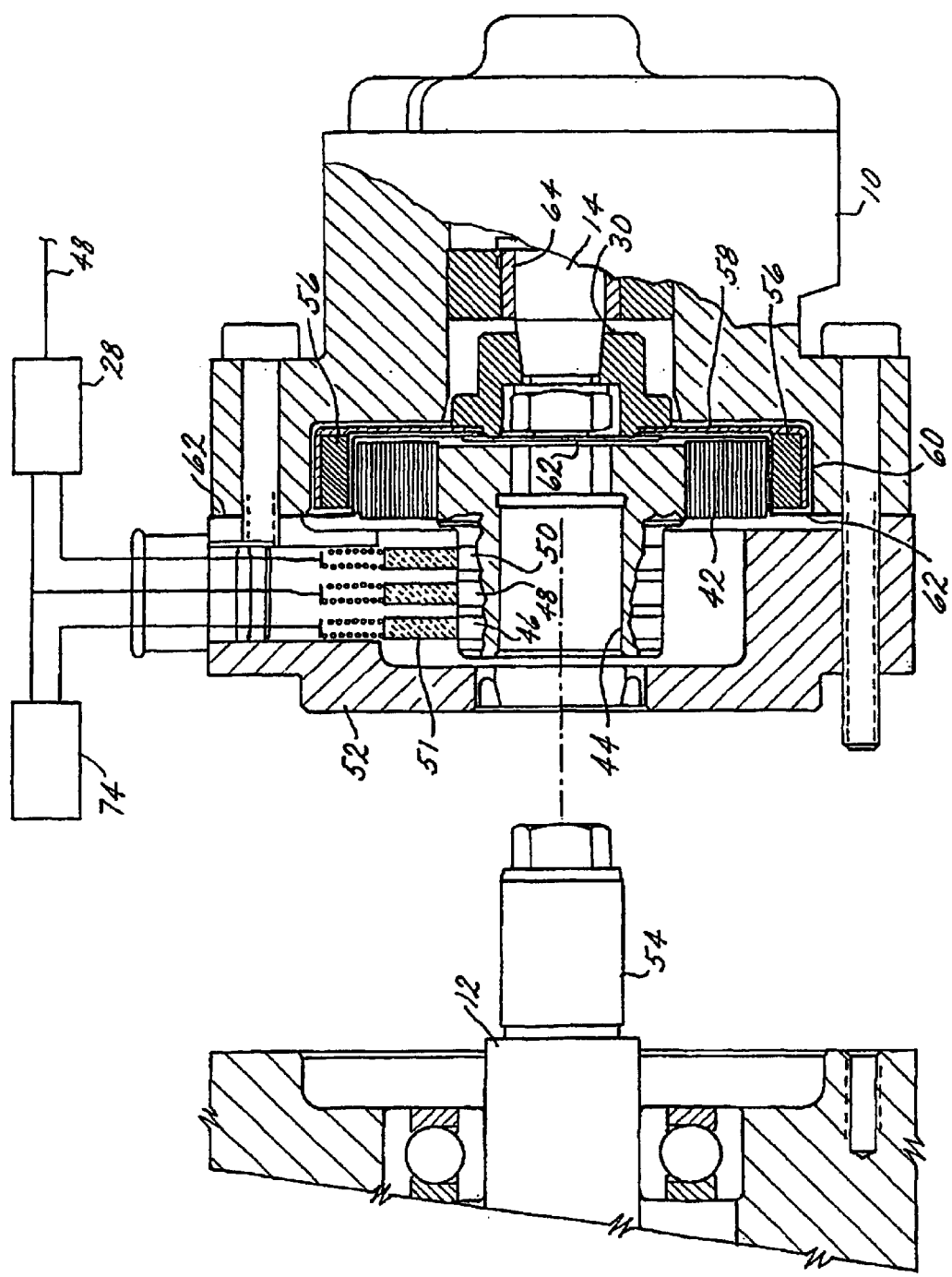
FIG. 3 is a view similar to FIG. 1 showing another embodiment of the clutch arrangement.

FIGS. 3 and 4 of the drawings illustrate another embodiment of the invention. In this embodiment, the energy-transmitting components are closely spaced apart radially rather than being axially arranged as in FIGS. 1 and 2. Specifically, the plurality of coils 42 are now mounted around the periphery of a rotor 44 with the rotor 44 also incorporating the slip rings 46, 48 and 50 contacted by the brushes 51. Although the minimum of three brushes and three slip rings are illustrated as well as three coils and four permanent magnets, the number of coils and/or permanent magnets can be varied to produce the desired clutch and motorizing functions for any particular situation. The rotor 44, which is partially enclosed in the housing segment 52, is both supported and driven by the extension 54 of the driving (cam) shaft 12 which is inserted into the central opening in the rotor 44. In this embodiment of the invention, the plurality of permanent magnets 56 are mounted on the support member 58 which is attached to the hub 30 much like the support disk 32 in FIG. 1. The support member 58 has an outer peripheral edge or flange 60 shaped to surround the coils 42. The permanent magnets 56 are mounted on this peripheral edge 60 such that they are directly radially outward from the coils 42. Mounted between the input side of the clutch with the drive shaft 12, rotor 44 and coils 42 and the output side with the pump and including the hub 30, the support member 58 and the permanent magnets 56 is the isolation barrier 62. The isolation barrier 62 is now cup shaped such that it extends between the coils 42 and the radially outward permanent magnets 56. Since the magnetic forces are now radial instead of axial, the bearing 64 supporting the pump shaft 14 does not need to accommodate axial forces. The clutch slippage is regulated by the same controller 28 as in FIG. 1.

Because there is no physical contact between the input and output shafts 12 and 14, the entire drive portion of the pumping component is hermetically sealed by the isolation barrier 40 or 62 and no shaft seals are needed. The absence of a shaft seal reduces friction losses, reduces heat rejection and drive power requirement, and also assures higher reliability by avoiding wear of the sealing components. It is also very likely that the total cost of such a system is very competitive.

Figure 5:
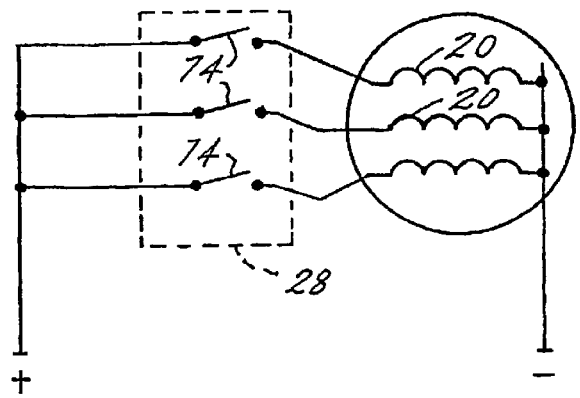
FIG. 5 is a schematic of the controller and electrical connections to the clutch for controlling the slippage of the clutch.
Figure 6:
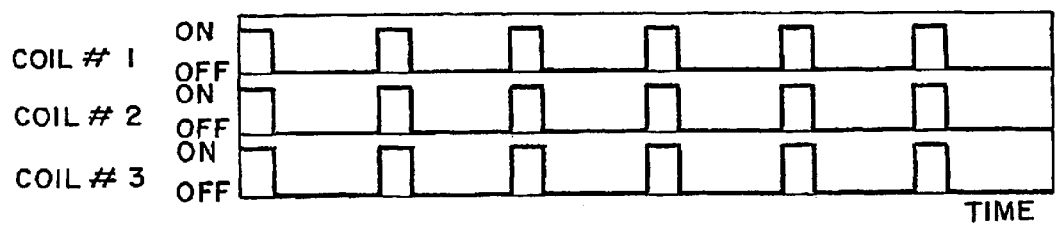
FIGS. 6 and 7 are charts illustrating the on-off cycles for the coils over time to control the slippage with FIG. 6 producing more slippage and low output and FIG. 7 producing less slippage and higher
Figure 7:
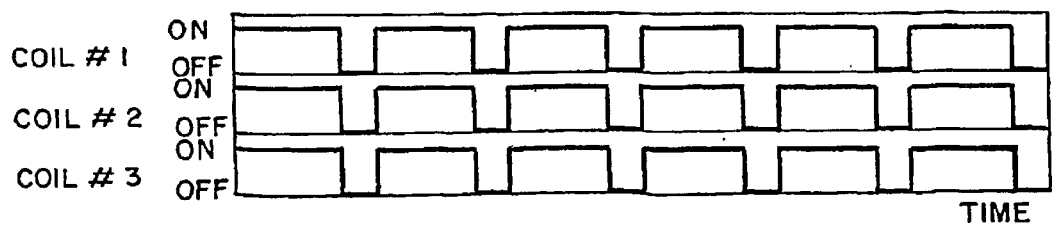

As indicated earlier, the fuel injection pump 10 is connected at 66 to the common rail or manifold 68 of the fuel injection system as shown in FIG. 1. The fuel injectors themselves would be connected into the rail 68. Mounted on the rail 68 is a pressure transducer 70 which is connected by the line 72 to the previously mentioned controller 28. In a typical industrial application, the reference feedback for a magnetic clutch is provided by a tachometer mounted on the output shaft. In the present invention, the actual pressure in the rail 68 is used as the reference feedback. The controller 28 modulates the application of power to the coils of the clutch in response to the rail pressure. That is, the current to the coils is turned on and off to vary the pulse width and control the amount of slippage. FIG. 5 is a schematic illustrating the connection of the coils 20 (or 42) to the controller 28 for the control of slippage. For this function, the switches 74 in the controller operate simultaneously. In FIG. 5, they are all shown as being open. The amount of slippage in the clutch is controlled by the ratio of the amount of time the switches are closed (power applied to coils) compared to the amount of time the switches are open. This is illustrated in FIGS. 6 and 7 with FIG. 6 illustrating short applications of power to the coils (short pulse width) resulting in greater slippage and lower output and FIG. 7 illustrating longer applications of power (long pulse width) and less slippage and greater output. This closed loop mode of operation permits regulation accuracy within 0.5% to 1%. Magnetic clutches commonly have a 34:1 speed range and, during a short period of time can transmit up to 250% of the rated torque. The torque transmission is very energy efficient and the power to the coils is only about 10% of the total drive power requirement.

A magnetic clutch unit can be purchased commercially, rated for 24V and capable of transmitting 108 Ncm torque at speeds between 50 RPM and 3300 RPM, at a global efficiency of 91% (electric motor and clutch). This compares very favorably with the expected losses of, for example, up to 50% with a solenoid valve demand controlled gasoline pump. Another advantage is that because the clutch can be deliberately overloaded up to 100% for a short time period (for example, during transient operation), the clutch can be relatively undersized. As a result, the heat rejection during the normal operation can be minimized.

Figure 8:
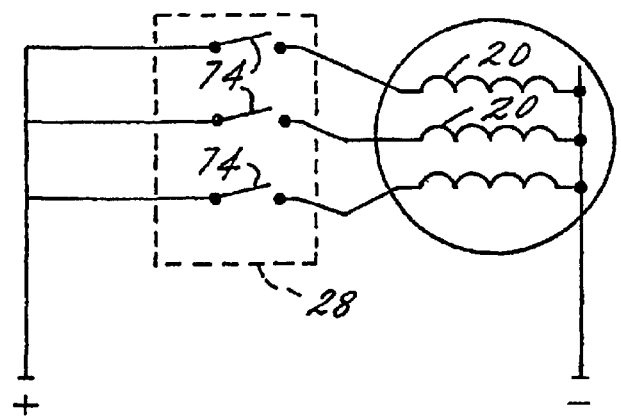
FIG. 8 is a schematic of the controller and electrical connections to the coils for the motorizing function.
Figure 9:
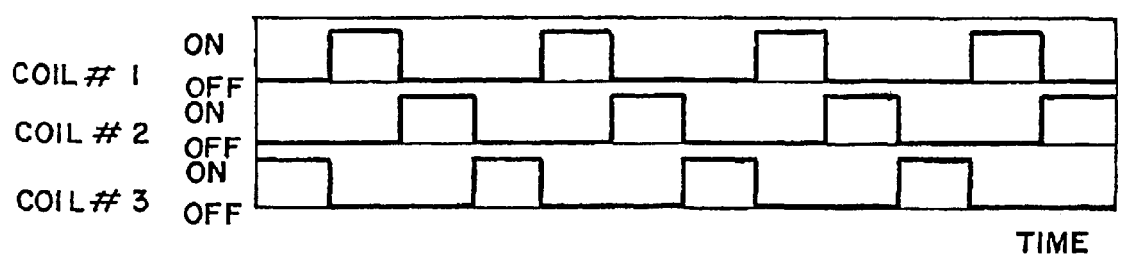
FIG. 9 is a chart illustrating the on-off cycles for the coils in the motorized operation of the clutch.

As the internal magnetic clutch components are very similar to the components of a stepper motor or a brushless electric motor, the clutch can be designed and the driving function can be expanded in such a way as to provide a "motorizing feature" for the clutch output shaft. This means that the clutch output shaft can be forced to rotate by an induced rotating magnetic field even before the engine starter begins to spin. This results in a very rapid pressure build up during cranking, which is a very desirable feature. Even with a modest motorizing capability of, for example, a maximum achievable speed of 1000 RPM, it could be used to enhance transient operation of a generally undersized pump. Referring to FIG. 8, the switches 74 are now closed and opened sequentially to produce the rotating magnetic field and cause the permanent magnets to rotate even when the input shaft 12 has not yet rotated. The time line application of power to the coils is illustrated in FIG. 9.

What is claimed is:

1. In the combination of a fuel injection pump having a rotatable pump shaft and a fuel outlet into a common fuel injection rail and an engine having a rotatable engine member for driving said rotatable pump shaft, a magnetic clutch between said rotatable engine member and said rotatable pump shaft for transferring torque from said rotatable engine member to said rotatable pump shaft wherein said magnetic clutch comprises electromagnetic coils attached for rotation with said rotatable engine member and permanent magnets juxtaposed to said electromagnetic colts and attached for rotating said rotatable pump shaft and further including an isolation barrier located between said permanent magnets and said electromagnetic coils thereby sealing said fuel injection pump from said engine and means for controlling slippage of said magnetic clutch comprising means for modulating the on-off cycle of electrical power simultaneously applied to said electromagnetic coils to maintain a desired fuel pressure in said common rail.

2. In a combination as recited in claim 1 and further Including means for rotating said permanent magnets and said rotatable pump shaft prior to rotation of said rotatable engine member and said electromagnetic coils comprising means for producing a rotating magnetic field from said electromagnetic coils.

3. In a combination as recited in claim 2 wherein said means for producing a rotating magnetic field comprises means for sequentially applying electrical power to said electromagnetic coils.

4. In a combination as recited in claim 1 wherein said magnetic clutch is controlled by varying the pulse width of power applied to said electromagnetic coils to maintain a desired fuel pressure in said common rail.

\* \* \* \* \*

UNITED STATES PATENT AND TRADEMARK OFFICE
CERTIFICATE OF CORRECTION

PATENT NO. : 6,840,229 B1
DATED : January 11, 2005
INVENTOR(S) : Djordjevic

It is certified that error appears in the above-identified patent and that said Letters Patent is hereby corrected as shown below:

<u>Column 4,</u>
Line 64, delete "colts" and substitute -- coils --.

Signed and Sealed this

Twenty-fifth Day of April, 2006

JON W. DUDAS
*Director of the United States Patent and Trademark Office*